United States Patent
Holtermann

[15] 3,666,803
[45] May 30, 1972

[54] N-HYDROXYALKYL-2,4,6-TRIIODOSUCCINANILIC ACIDS

[72] Inventor: Hugo Holtermann, Baerum, Norway
[73] Assignee: Nyegaard & Co. A/S, Oslo, Norway
[22] Filed: June 6, 1969
[21] Appl. No.: 831,207

[30] Foreign Application Priority Data

June 11, 1968 Great Britain......................27,698/68

[52] U.S. Cl.................................................260/519, 424/5
[51] Int. Cl.......................................................C07c 103/32
[58] Field of Search..................................................260/519

[56] References Cited

OTHER PUBLICATIONS

Karrer, Paul, Organic Chemistry (1950) Pub. by Elsevier Pub. Co., Inc. (New York) QD258K33c.5, page 453

*Primary Examiner*—Lorraine A. Weinberger
*Assistant Examiner*—L. Arnold Thaxton
*Attorney*—Bacon & Thomas

[57] ABSTRACT

Compounds of the formula

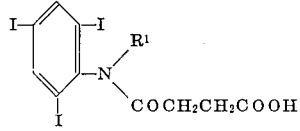

wherein $R^1$ is an alkyl group carrying at least one hydroxyl group and salts thereof with bases. The compounds are prepared by reacting 2,4,6-triiodosuccinanilic acid with a hydroxyalkylating agent. The compounds are useful as cholecystographic agents.

4 Claims, No Drawings

N-HYDROXYALKYL-2,4,6-TRIIODOSUCCINANILIC ACIDS

This invention concerns novel cholecystographic X-ray contrast agents.

In the X-ray visualization of the gall bladder, it is desirable to administer a contrast agent which will concentrate in the system to be visualized, remain for a period sufficient for X-ray investigation and then be excreted within a relatively short time. The contrast agent should be non-toxic and free from undesirable side effects, such as nausea and diarrhoea and it is also particularly convenient if it can be administered by the oral route.

Many cholecystographic agents have been proposed previously but have shown poor absorption on oral administration, undue toxicity and side effects or disturbing shadows from the intestinal region. It has often been found that attempts to increase the rate of excretion have led to compounds of increased toxicity.

We have now found that the N-hydroxyalkyl-2,4,6-triiodosuccinanilic acids have shown themselves to fulfill the desiderata of a good cholecystographic agent particularly well and are in general superior to the corresponding N-(unsubstituted alkyl)-compounds, in that they are less toxic while retaining approximately the same rate of bile excretion.

According to the present invention we provide compounds of the general Formula

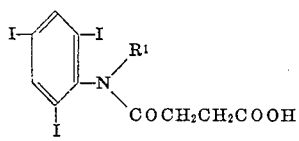

(wherein $R^1$ an alkyl group carrying one or more hydroxyl groups) and their salts with bases.

$R^1$ preferably possesses one to five carbon atoms and is most advantageously the hydroxyethyl or dihydroxypropyl group.

The new compounds according to the invention may be administered as acids or as salts. Salts for administration should, of course, by physiologically acceptable at the doses normally employed in the particular route of administration and such salts include, for example, alkali metal, e.g., sodium or potassium, salts or alkaline earth metal, e.g., calcium or magnesium, salts but other salts may be of use in the isolation of purification of the acids.

The new compounds according to the invention may be formulated for administration in any convenient way, normally in conjunction with a radiological carrier or excipient. Although the oral formulations are the most suitable in practice, the effective substances may be administered by the rectal route where desirable, in appropriate formulations such as suppositories.

Oral formulations may, for example, take the form of tablets, coated tablets, capsules, granulates, effervescent granulates and the like, the carriers or excipients including for example, carriers such as a starch, sugar or talc; lubricants such as magnesium stearate; binding agents such as carboxymethyl cellulose; effervescent agents such as tartaric acid and sodium carbonate; oils; wetting agents; flavor agents and the like.

A suitable dose for an adult will be in the range 2–6 grams of the contrast substance. The formulations preferably take the form of dosage units such as tablets, effervescent granulates or capsules, each of which contains 0.25 to 3 g. Tablets containing 0.4 to 0.6 g are the preferred dosage unit form.

The new compounds according to the invention can be prepared in any convenient way.

According to a further feature of the invention we provide a process for preparing the new compounds of Formula I as defined above in which 2,4,6-triiodosuccinanilic acid is reacted with a hydroxyalkylating agent.

The hydroxyalkylating agent may, for example, be a ester, e.g., a halide, sulphate or hydrocarbon-sulphonate of a hydroxyalkane; hydroxyalkyl groups can conveniently also be introduced by reaction with epoxides such as ethylene oxide or glycide. The hydroxyalkylation proceeds readily in aqueous media, under basic conditions, for example in the presence of an alkali metal hydroxide, e.g., sodium or potassium hydroxide; alcoholic media may also be used, under both neutral and basic conditions, for example using an alkali metal alkoxide. Aqueous alcoholic media may also be used. Thus for example, suitable reagents include ethylene oxide, glycide, 2-chloroethanol and 3-chloro-propandiol-1,2. Halogenoalkyl esters such as β-chloroethyl acetate may also be used, the ester grouping normally being hydrolyzed under the reaction conditions.

The following examples are given by way of illustration only; infra red spectra were recorded on Perkin Elmer Model 21 Double Beam Spectrometer in KBr pellets. Melting points are not corrected. All temperatures are in °C:

EXAMPLE 1

N-(β-Hydroxyethyl)-2,4,6Triiodosuccinanilic Acid —
Method A. β-Chloroethyl Acetate as Alkylating Agent 2,4,6Triiodosuccinanilic acid (11.4 g. 20 mmole) was suspended in methanol (120 ml) and partly dissolved by adding 4.9 M sodium methylate (16 ml, 79 mmole). β-Chloroethyl acetate (4.1 ml, 2 sq.) as added at room temperature and under stirring. After 29 hours, 4.9M sodium methylate (8 ml) and β-chloroethyl acetate (4.1 ml) were added. After stirring for twenty one hours, the mixture was diluted with water (200 ml) and small amounts of undissolved material filtered off. The product precipitated as white crystals by careful addition of 6N hydrochloric acid. Yield: 10.6 g (87 percent). After two recrystallizations from ethyl acetate, the acid melted at 152°–166°. (Found C 23.66; H 2.13; I 61.6; N 2.38; E 616. Calc. for $C_{12}H_{12}I_3NO_4$: C 23.45; H 1.96; I 61.9; N 2.28; E 615).

Method B. 2-Chloroethanol as Alkylating Agent. Sodium Methylate as Solvent.

2,4,6-Triiodosuccinanilic acid (5.7 g. 10 mmole) was suspended in methanol (60 ml) and partly dissolved by adding 4.9M sodium methylate (8 ml, 39 mmole). 2-Chloroethanol (1.35 ml, 2 equiv.) was added with stirring. After four and a half hours, 4.9M sodium methylate (4 ml) and 2-chloroethanol (1.35 ml) were added. After stirring for the night, the latter addition was repeated. After 4 hours, the reaction mixture was diluted with water (100 ml), filtered and carefully acidified with 6N hydrochloric acid. The reaction product precipitated as white crystals. Yield: 5.3 (87 percent). After two recrystallizations from ethylacetate, the acid melted at 152°–156°. Its infrared spectrum was identical with the spectrum of the acid prepared by method A. (Found: C, 23.66; H, 2.01; I, 60.7; N, 2.45. Calcd. for $C_{12}H_{12}I_3NO_4$: C, 23.45, H, 1.96; I, 61.9; N, 2.28).

Method C. 2-Chloroethanol as Alkylating Agent. A Mixture of Ethanol-5N Sodium Hydroxide as Solvent.

2,4,6-Triiodosuccinanilic acid (5.7 g, 10 mmole) was dissolved in a mixture of ethanol (15 ml) and 5N sodium hydroxide (15 ml, 75 mmole) and heated at 60° (in the bath). Then 2-chloroethanol (2.37 ml, 35 mmole) was added. After half an hour, the solution was diluted with water (70 ml and acidified with 6N hydrochloric acid. The product precipitated as a yellow oil, which crystallized over a few hours. Yield: 6 g. After two recrystallizations from ethyl acetate, the product melted at 141°–152°. Its IR spectrum was identical with with spectra of the acids prepared by methods A and B.

EXAMPLE 2

N-(Dihydroxypropyl)-2,4,6-Triiodosuccinanilic Acid
2,4,6-Triiodosuccinanilic acid (5.7 g; 0.01 mole) was suspended in methanol (25 ml), and converted to its sodium salt by adding 4.6 M sodium methylate (2.35 ml; 0.01 mole). Glycide (1.9 ml; 0.03 mole) was then added and the mixture stirred for 4 days at room temperature. After filtration, the filtrate was evaporated to dryness. The residue was dissolved in water (20 ml) and the free acid precipitated as a sticky product by adding 6N hydrochloric acid;
Found I 55.8 %
Calculated for $C_{13}H_{14}I_3NO_5$ I 59.1 %
On paper chromatography, eluting with butanol; ethanol; ammonia; water (4:1:2:1), the $R_f$ value was 0.38. The $R_f$ value of the starting material was 0.59

The following examples of formulations are now given by way of illustration only:

Formulation 1 Granulate 3 g of sodium salt of N-($\beta$-hydroxyethyl)-2,4,6-triiodo-succinanilic acid
4.8 g. of fine sugar,
0.05 g. of carboxymethyl cellulose
0.025 g. of polyhydroxymethylene stearate,
0.08 g. of flavoring The above substances are weighted out in the above proportions moistened with alcohol and then granulated in the granulating machine.

Formulation 2 Effervescent Granulate 3 g. sodium salt of N-($\beta$, $\gamma$-dihydroxypropyl)-2,4,6-triiodo-succinanilic acid
3.375 g. of tartaric acid,
0.0122 g. of polyhydroxy stearate,
0.0122 g. of sodium lauryl sulphonate,
3 g. of fine sugar,
2.25 g. sodium carbonate.

The above substances are weighted out in the above proportions moistened with alcohol and granulated.

Formulation 3 Tablets 0.75 kg. of maize starch are mixed with 5.00 kg. of sodium salt of N-($\beta$-hydroxyethyl)-2,4,6-triiodosuccinanilic acid and 0.75 kg. of sucrose.

The mixture is moistened with 1,000 cc. of 50 percent aqueous ethanol and then granulated in the machine, i.e., dried in a current of air at a temperature of 40° to 50° C. The dry granulate is screened, 0.70 kg. of maize starch, 0.05 kg. of talcum and 0.05 kg. of magnesium stearate are added thereto and compressed to form 10,000 tablets.

Formulation 4 Capsules 0.5 g. of the sodium salt of N-($\beta\gamma$-dihydroxypropyl)-2,4,6-triiodosuccinanilic acid is filled into one half of a gelatine capsule and the other half of the capsule is then fitted on top thereof. Both halves are then united and sealed to form a gelatine capsule.

Formulation 5 Capsules 750 g. of sodium salt of N-($\beta$-hydroxyethyl)-2,4,6-triiodosuccinanilic acid
600 g. of sesame oil, and
100 g of vegetable lecithin
are stirred to form a paste and filled into 1,000 gelatine capsules.

I claim:

1. A compound of the formula

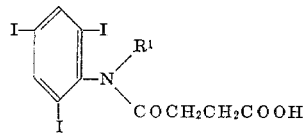

wherein $R^1$ is a hydroxy alkyl group of one to five carbon atoms or a physiologically acceptable salt thereof with a base.

2. A compound as claimed in claim 1 in which $R^1$ is selected from the group consisting of hydroxyethyl and dihydroxypropyl groups.

3. A compound as claimed in claim 1 in the form of a physiologically acceptable salt.

4. A compound as claimed in claim 3 which is selected from the group consisting of alkali metal and alkaline earth metal salts.

* * * * *